Jan. 4, 1927.
C. T. RAY
1,613,411
FERTILIZER DISTRIBUTOR
Filed Oct. 30, 1922
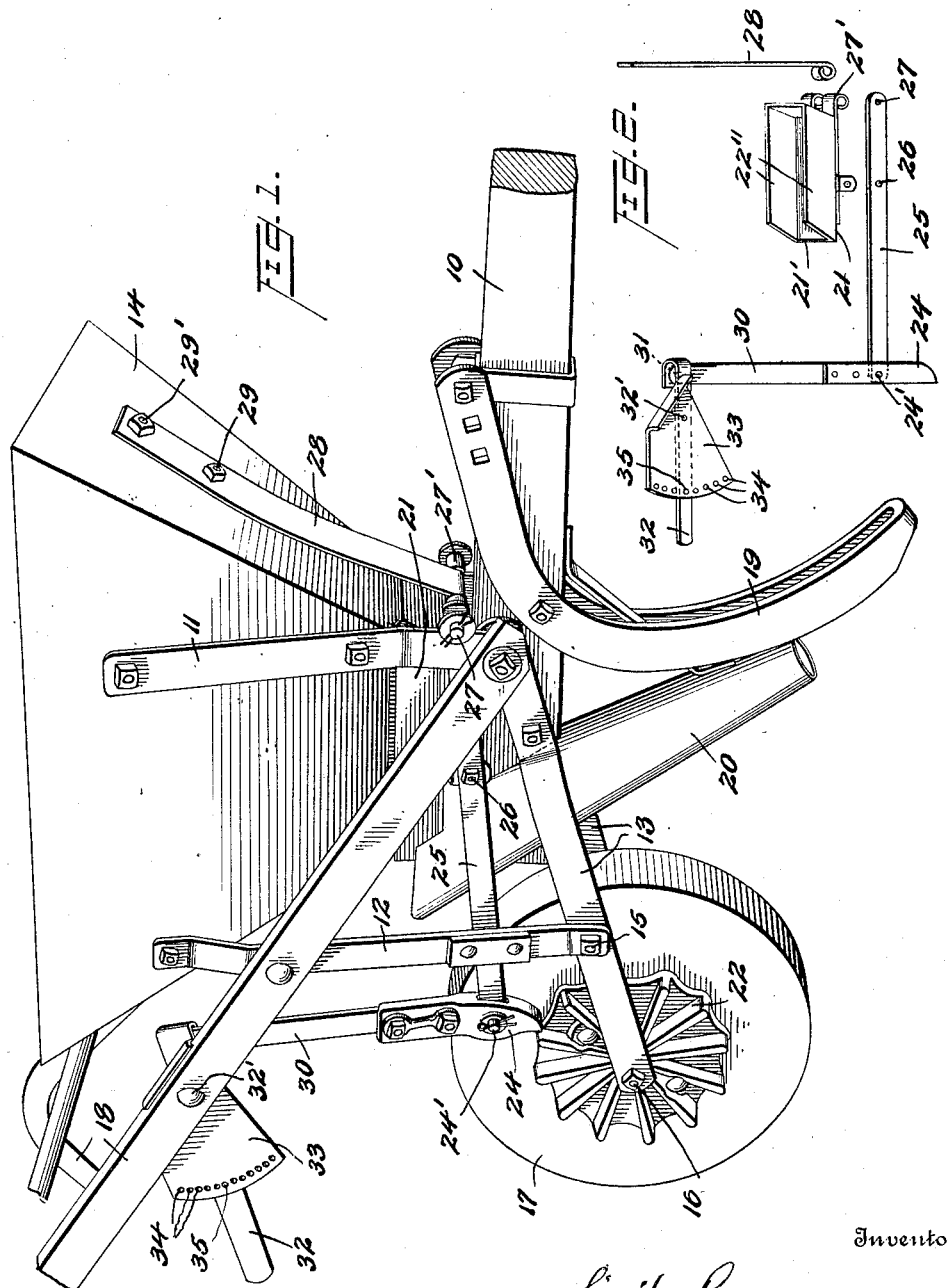
Inventor
C. T. Ray
By C. J. Strickman
Attorney Patented Jan. 4, 1927.

1,613,411

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

FERTILIZER DISTRIBUTOR.

Application filed October 30, 1922. Serial No. 597,872.

It is well known that implements for distributing fertilizer as now embodied cannot be relied upon to distribute the fertilizer evenly, particularly when adjusted for a light distribution of fertilizer, and it is also known that they cannot be relied upon to distribute the fertilizer properly in wet weather, especially when the fertilizer is of a nature such that it is sensitive to weather conditions, as is the case with those commercial fertilizers containing phosphate, for example. Again, it is well known that fertilizer distributors of the type wherein the discharging element is actuated by power derived from the travel of the ground wheel, as now embodied, are open to the objection that the amount of distribution for a given length of travel is affected by the speed of travel of the implement over the ground to be fertilized.

Important purposes of this invention are to overcome these disadvantages and accordingly I have devised a combination and correlation of parts, in an implement of the character embodying a discharging element operated or controlled by power derived from the travel of the ground wheel, characterized, severally as follows, namely, in that: (1) the operation of said discharging element partakes of the nature of a series of rapid vibratory bodily and rocking impulses; (2) the impulses in one direction are in a direction opposite to that of the discharge of the fertilizer and are positively derived from the travel of the ground wheel, with which the discharging element is positively connected while these impulses are being produced and from which the discharging element is automatically released for the opposite impulses, the latter impulses being in the direction of the discharge of the fertilizer produced by a means which is rendered operative therefor by the operation of the ground wheel while the latter is positively connected with the discharging element and being of a rapid nature suddenly stopped to cause the fertilizer to be positively and forcibly propelled over the discharging edge of the discharging element whereby the speed of the discharging impulse and the force imparted thereby to expel the fertilizer from the discharging element is not affected by the speed of travel of the implement; (3) the discharging element is so mounted that its non-discharge end has an up and down movement relative to the discharge end as well as a movement in the direction of discharge, whereby a forcible impact of the discharge element against the fertilizer in the hopper is produced which causes lumps to be broken up which lumps might otherwise cause a variance of the steady flow of fertilizer.

In the practical embodiment of the invention, I prefer to employ, because of the inherent advantages in such an arrangement and correlation of parts, as the means for effecting the discharging impulses, a strong spring so arranged with relation to the discharging element that it will still be under tension at the end of the discharging impulses, so that the stoppage of the discharging impulses will produce a force adequate to break up lumps and to assure the positive and forcible expulsion of the fertilizer from the discharging element. In other words, another purpose of the invention is to provide a new combination and arrangement of elements whereby the described impulses will be given the discharging elements by means of a most simple, practicable and effective nature.

In the accompanying drawings illustrating the preferred embodiment of the invention and wherein like characters of reference denote corresponding parts:

Fig. 1 is a perspective view of an implement embodying my improvements.

Fig. 2 is a detail view to show certain of the elements separated from each other.

The frame here shown is composed of a beam 10 and bars 11, 12 and 13. The bars 11, 12 and 13 support the hopper 14 (which contains the fertilizer to be distributed,) from the beam. While the bars 11, 12 and 13 at one side only of the implement are shown, it will be understood that like bars are at the opposite side of the implement and that the hopper is mounted between and secured to the bars 11 and 12 at one side and a like pair of bars (not shown) at the opposite side. The bars 13, are secured to the beam at their forward ends and also carry the bars 12 which are fixedly secured thereto at 15. Their rear ends form supports for the journal 16 of a ground wheel 17 which may be of any suitable construction. The frame of the implement is provided with suitable handles 18 for the usual purpose. 19 designates a standard which may in practice be provided with a shovel or blade (not shown) to open the soil for the reception of the fertilizer and 20 designates a spout to receive the fertilizer from the hopper and conduct it to the ground.

No novelty is claimed for any of the foregoing parts as thus far described, as they may be of the usual or any suitable construction. The hopper is of course preferably formed with a constricted outlet opening in its bottom, with all of its sides converged toward said opening so that the fertilizer will be fed gravitationally to the opening, there preferably being no ledges or other obstructions around the opening.

The opening is covered by a discharging element 21 suitably arranged to deliver the fertilizer into the mouth of the spout. This discharging element has an opening 21' presented to the spout, its remaining sides having flanges 22" to prevent discharge of the material thereover. This shape of the discharging element enables it to hold a quantity of fertilizer separated from the main body thereof, in the hopper and thereby contributes to the discharge of a proper amount of fertilizer into the chute 20 at each discharging impulse given the discharging element.

The discharging element 21 is mounted to have forward and rearward movement about a center arranged below the element, instead of above the same, and to have its said forward and rearward movements controlled by the rotation of the ground wheel 17. The described movement is given the discharging element, in the illustrated embodiment of the invention, through the medium of the following elements, namely: a pitman 25 which carries said discharging element; means, as an arm 30, for example, which pivotally suspends the rear end of the pitman from a suitable fixed part of the structure; a suitable actuating element controlled by the ground wheel 17, as the element 22 secured to one side of said wheel and formed with a series of suitably spaced teeth, for example, operatively related to said arm and pitman to impart intermittent forward impulses thereto; and a means, as the spring 28 whose upper end is rigidly secured to the forward wall of the hopper, at 29, 29', and whose lower end is so correlated with the discharging element, pitman and arm 30 that it will impart thereto intermittent rearward impulses alternating with the forward impulses derived from the ground wheel. In this illustrated embodiment, moreover, the pitman is fixedly connected between its ends, at 26, to the bottom of the discharging element (21) and has its rear end pivoted at 24' to a member 24 which forms an extension of the arm 30 and provides the element which engages, or is engaged by, the teeth of the actuating element, successively, in the rotation of the ground wheel; the upper end of said arm is pivoted at 31 (Fig. 2) to a lever 32 which is pivoted at 32' to one of the handles 18; and the spring 28 has its lower end connected to the forward end of the pitman 25 and discharging element 21 through the medium of a pivot pin 27 mounted in bearings 27' carried by the discharging element 21

It is to be here noted that the lower end of the spring 28 and the non-discharging end of the discharging element 21, which are pivoted together by the pin 27, have a movement about a center which is movable and will be somewhere along the spring member 28 between its securing means and the lower end thereof. It is to be noted also that the discharging element 21, due to the upward divergence of the supporting members 28 and 30 during the discharging operation has a rocking movement about a center which is below the discharge element. This center does not necessarily remain at a point throughout the movement, the result being the same as long as this rocking movement, as distinguished from a swinging movement, is obtained.

The described mounting of the arm 30 not only enables it to support the rear end of the pitman 25 and to carry the member which is engaged by the actuating element 22, but moreover, is such as to permit an adjustment relatively to the teeth of said actuating element to regulate the throw of the pitman 25 and also permit movement such as to render the actuating element inoperative with relation to the means which actuates the discharging element, at will. In order that the arm 30 and hence the member 24 which is carried thereby and which engages or is engaged by the teeth of the actuating element 22 may be held in any position of its adjustment which regulates the throw of the pitman, I have illustrated a means which consists of a plate 33 having a series of perforations 34 concentrically arranged with respect to the axis of rotation of the lever 32, any of which perforations is adapted to receive a projection 35 extending from the side of the lever 32, which lever will preferably be made of spring steel to allow it to bend laterally to free its projection from a perforation in the plate 33 and cause it to spring back and engage its projection with another perforation when it has been adjusted to its selected position. This holding means, however, is only one of a number which may be employed to secure the lever in different adjusted positions and obviously the invention is in no respect restricted thereto.

In operation the intermittent forward impulses given the member 24 are communicated to the pitman 25 and each of these impulses moves the discharging element 21 in a forward and downward direction and increases the tension of the spring 28, imparting to the latter sufficient power, when released to move the discharging member 21 rearwardly and upwardly and the pitman 25 and member 24 rearwardly until stopped by a suitable means here shown as provided by the lower end of the bar 11 arranged to be engaged by the outer end of the pivot pin 27 before the spring 28 has lost its power. It will be noted that the spring not only acts to impart rearwardly and upwardly impulses to the end of the discharging element remote from its discharge end and to forcibly bring about a sharp impact of one stop against another resulting in the sudden stoppage of the discharging element and forcible expulsion of fertilizer therefrom, but also acts through its connection with the pitman to exert tension on the member 24, holding the member yieldably against the tooth which is operating to press it forward and assuring that the action of the tooth on the member and of the member on the pitman will be sufficiently positive to work unfailingly. Moreover, it will be noted (1) that the discharging element 21 is supported upon a pitman 25 which in turn is supported at its opposite ends by the arm 30 and the spring 28, respectively; (2) that the lower end of the arm 30 swings about the point 31 at the upper end of said arm as a center; (3) that the forward or non-discharging end of the discharging element 21 is connected to the forward end of the pitman 25 and to the lower end of the spring 28 by the pivot pin 27. It will be noted that the pin 27 swings bodily about a point which is somewhat below the bolt 29. The portion of the spring below said bolt 29 extends outwardly and rearwardly and makes an obtuse angle with the pitman 25. It will also be noted that the angle between the pitman 25 and the arm 30 is substantially a right angle. Hence, movement of the pitman caused by engagement with the actuating element 22 will cause substantially no vertical change in the point of connection between said pitman and the arm 30, but will cause a very much greater change in the level of the forward end of the pitman. This change of level is the lowering of the discharging element, the rear end being lowered less than the forward end. When the pitman 25 is released the reverse movements take place, caused by the tendency of the spring 28 to return to its former position. This return movement causes an upward and rearward movement of the discharging element, the forward end being raised a greater distance than the rearward end. This raising and lowering of the discharging element 21 will cause an impact during each rearward stroke against the fertilizer which is coming from the mouth of the hopper. Any tendency for lumps to prevent proper delivery of the fertilizer will be thus counteracted. It will also be seen, that the discharge end of the discharging element will be relatively at its lowest point at the end of the rearward stroke inasmuch as said end is nearest to the rear. In short, at the moment the discharging element is arrested suddenly by impact against the member 11 this discharge element is discharging fertilizer to the chute 20 and at the same time preparing the fertilizer at the mouth of the hopper for delivery to the discharging element for its next stroke. Again, it will be noted that the rocking action imparted to the discharging element in its forward and backward movements, is due to the correlation of the pivots 31 and 24' and the ability of the spring to bend from a point adjacent the fastening 29 aids in the discharge of the fertilizer by enabling gravity to be utilized in such discharge. And, finally, it should be noted that in the operation of the implement the impulses are of such rapidity that those impulses which I have referred to as the discharging impulses and the impacts of the stops against each other recur with such frequency that the discharge of the fertilizer is substantially constant, the intervals between them being substantially negligible as far as any lack of fertilization is concerned. In other words, the ground over which the implement has operated shows no substantial intervals of untreated soil.

While I have described the preferred embodiment somewhat minutely, it will be apparent that changes in the details may nevertheless be made without substantial departure from the scope of the invention as defined by the appended claims.

Having thus described the invention, what I claim is:

1. In a fertilizing implement, a hopper having an opening, a fertilizer discharging element for discharging fertilizer at one of its edges, means for imparting movement to the discharging element toward and away from the hopper opening and for giving greater movement to that portion of the discharging element remote from the discharging edge than to that portion adjacent the discharging edge.

2. In a fertilizing implement, a hopper having an opening, a fertilizer discharging element for discharging fertilizer at one of its edges, means for imparting movement to the discharging element toward and away from the hopper opening and for giving greater movement to that portion of the discharging element remote from the discharging edge than to that portion adjacent the discharging edge including a spring and means for suddenly arresting the movement of the discharging element at the end of its discharge stroke.

3. In a fertilizing implement, a fertilizer discharging element, means co-operating to impart intermittent impulses bodily to said element in opposite directions, respectively, having connections to cause the discharging element to be moved about a center below and away from its fertilizer contacting portion while it is being moved bodily, and means to suddenly arrest the movement of the discharging element in one direction.

4. In a fertilizer distributor, a frame, a fertilizer container mounted thereon, and having an outlet, a ground wheel connected to the frame, a discharging element movable bodily about a center therebelow operatively related to the container outlet and arranged to discharge the material over one of its edges, and means for imparting vibratory impulses bodily in opposite directions to the discharging element, comprising an actuating element carried by the ground wheel, means operated thereby to impart intermittent movement in one direction to the discharging element, a spring whose tension is increased in each said movement of the discharging element and which is operable to forcibly propel the discharging element in the opposite direction, and means to suddenly stop the movements of the discharging element in the latter direction.

5. In a fertilizer distributor, a frame, a fertilizer container having an outlet, a movable discharging element operatively related to the container outlet, a ground wheel and teeth rotative with the ground wheel, in combination with a pitman connected to the discharging element, a pivotally suspended supporting element for said pitman, pivotally connected to one end thereof, a member to be engaged by said teeth to transmit impulses in one direction to said suspended element, pitman and discharging element and a spring which supports the other end of the pitman and discharging element and imparts thereto intermittent impulses in the opposite direction.

6. In a fertilizer distributor or a frame, a fertilizer container carried thereby and having an outlet, a movable discharging element operatively related to the outlet, and a ground wheel having teeth rotated therewith, in combination with a pitman, a pivotally suspended supporting element for the pitman having pivotal connection therewith and provided with a member to be engaged by said teeth, means to adjust said element to vary the throw of the pitman, and means to intermittently move the discharging element in the direction opposite that in which it is moved by its connection with the teeth on the ground wheel.

7. In a fertilizing implement, a hopper having an opening, a fertilizer discharging element for discharging fertilizer at one of its edges, means for imparting to the discharging element a movement about a center below the element as contra-distinguished from a swinging movement, to move the discharging element toward and away from the hopper opening.

8. In a fertilizing implement, a hopper having an opening, a fertilizer discharging element having a discharging end, and means to impart a forward and backward bodily movement to the discharging element and to cause the end of the discharging element remote from the discharging end to change its height a greater amount than the discharging end.

9. In a fertilizing implement, a hopper having an opening, a fertilizer discharging element having a discharging end and means to impart a forward and backward bodily movement to the discharging element about points below the center of gravity of the element, one end of the discharging element changing its height relative to the hopper opening.

10. In a fertilizing implement, a fertilizer discharging element having a discharging edge, means for bodily moving the discharging element in a path to cause the discharging element to move so that its discharge edge will move up and down with its edge remote from the discharge edge but to a less degree.

11. In a fertilizing implement, a hopper having a discharge opening, a fertilizer discharging element and means to impart during the discharging movement a bodily movement to the bottom of the discharging element upwardly in the direction of the discharge opening, to thereby break up lumps the bottom of the discharge element constantly changing its relation to the horizontal during movement.

12. In a fertilizing implement, a fertilizer discharging element having a discharging edge, and means to impart during the discharging movement a movement to the bottom of the discharging element upwardly in the general direction of the discharge and to cause the operation of the discharging element opposite said discharging edge to have a greater upward movement than the discharging edge.

13. In a fertilizing implement, a movable fertilizer discharging element, means to operate said discharging element including elements to vibrate the same by imparting thereto intermittent impulses giving movements in opposite directions and which movements have horizontal and vertical components to cause the non-discharge end of the discharging element to change its travel more than the discharge end thereof.

14. In a fertilizer distributor, a movable discharging element and an operating means therefor, including a pitman which carries the discharging element and means for imparting operating impulses longitudinally in opposite directions and a bodily up and down movement to the pitman and discharging element.

15. In a fertilizer distributor, a movable discharging element and an operating means therefor, including a pitman which carries the discharging element and means for imparting operating impulses in opposite directions and a movement to the pitman and discharging element, about a center below the center of gravity of the discharging element, including a support for one end of the pitman pivotally connected thereto.

16. In a fertilizer distributor, a movable discharging element and an operating means therefor, including a pitman which carries the discharging element and means for imparting operating impulses in opposite directions and a movement to the pitman and discharging element about a center below the center of gravity of the discharging element, having a spring pivotally supporting one end of the pitman.

17. In a fertilizer distributor, a movable discharging element and an operating means therefor, including a pitman which carries the discharging element, a support for one end of the pitman pivotally connected thereto, a spring connected to the opposite end of the pitman, and means co-operating with said support and spring for imparting operating impulses in opposite directions and a bodily movement to the pitman and discharging element.

18. In a fertilizer distributor, a hopper, a bodily movable fertilizer discharging element operatively related to said hopper, a ground wheel, and means under control of the ground wheel and co-operating to move the discharging element bodily in opposite directions and about a center therebelow, the said means including teeth rotative with the ground wheel, a pivoted element, a second element sustained at one end by the pivoted element and supporting the discharging element, a member to be engaged by said teeth, successively, and correlated with the pivoted element and second element to transmit thereto movement derived from said teeth and in one direction, and a spring having a pivotal connection at one end with the other end of said second member and operative to move the parts in the direction opposite that derived from said teeth.

19. In a fertilizer distributor, a hopper, a fertilizer discharging element, a plurality of supporting means connected to the discharging element at different places and having upwardly divergent portions.

20. In a fertilizing implement, a fertilizer discharging element; a pivoted arm; a pitman having connection at one end with the arm; means connecting the pitman to the fertilizer discharging element; and means for imparting movement to the pivoted arm, pitman and discharging element, including a ground wheel having spaced members and an element carried by the pivoted arm and arranged in the path of said spaced members to be engaged by the same successively.

21. In a fertilizing implement, a hopper, a handle on the hopper, a fertilizer discharging element and means for moving the said fertilizer discharging element bodily in opposite directions including a ground wheel, spaced members on the ground wheel, a pivoted arm operated intermittently by said spaced members and a pitman which carries the fertilizer discharging element and has one of its ends pivoted to said arm.

22. In a fertilizing implement, a hopper, a handle on the hopper, a fertilizer discharging element, and means for moving the said fertilizer discharging element bodily in opposite directions, including a ground wheel having spaced members, a pitman connected to the fertilizer discharging element, a spring supported by the hopper and pivotally supporting one end of the pitman, an arm having pivotal connection with the end of the pitman and provided with an element to be engaged by the spaced members on the ground wheel, successively, and means to pivotally suspend the arm from said handle including elements by which the arm may be set selectively in different positions to correspondingly adjust the throw of the pitman.

In testimony whereof I affix my signature.

CHARLES T. RAY.